(12) United States Patent
Maeng

(10) Patent No.: US 11,531,891 B2
(45) Date of Patent: Dec. 20, 2022

(54) COOKING APPARATUS FOR DETERMINING COOKED-STATE OF COOKING MATERIAL AND CONTROL METHOD THEREOF

(71) Applicant: LG ELECTRONICS INC., Seoul (KR)

(72) Inventor: Ji Chan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 16/818,835

(22) Filed: Mar. 13, 2020

(65) Prior Publication Data
US 2021/0182667 A1    Jun. 17, 2021

(30) Foreign Application Priority Data
Dec. 12, 2019 (KR) .......................... 10-2019-0165571

(51) Int. Cl.
*G06N 3/08*         (2006.01)
*F24C 7/08*         (2006.01)
(Continued)

(52) U.S. Cl.
CPC .................. *G06N 3/08* (2013.01); *F24C 7/08* (2013.01); *F27D 21/02* (2013.01); *G06F 21/32* (2013.01);
(Continued)

(58) Field of Classification Search
CPC ........ G06N 3/08; G06N 3/0472; G06N 5/003; G06N 7/005; G06N 20/10; G06N 3/02;
(Continued)

(56) References Cited

U.S. PATENT DOCUMENTS

| 9,933,165 B2 | 4/2018 | Matarazzi et al. |
| 2016/0174748 A1* | 6/2016 | Baldwin ............... A47J 36/321 99/330 |

(Continued)

FOREIGN PATENT DOCUMENTS

| EP | 3742052 A1 * | 11/2020 | .............. A47J 36/32 |
| KR | 1020150049026 | 5/2015 | |

OTHER PUBLICATIONS

Khan, Tareq. "Smart Microwave Oven with Image Classification and Temperature Recommendation Algorithm." International Journal of Electrical & Computer Engineering (2088-8708) 8.6 (2018). (Year: 2018).*

*Primary Examiner* — Maurice L. McDowell, Jr.
(74) *Attorney, Agent, or Firm* — Lee, Hong, Degerman, Kang & Waimey PC

(57) ABSTRACT

The present disclosure provides a cooking apparatus and a method for controlling the same for analyzing changes in the internal temperature, the external temperature, and the surface of a cooking material that is being cooked, and appropriately heating the cooking material based on the analysis result to cook the same. In particular, the intensity of heat emitted toward the cooking material from a heater or the cooking time may be controlled using an artificial intelligence (AI) model, which executes machine learning (ML) over a 5G network, such that the cooking material is appropriately cooked in accordance with a change in the surface of the cooking material and a change in a thermal image representing the internal temperature and the external temperature of the cooking material.

16 Claims, 9 Drawing Sheets

(51) Int. Cl.
  *G06K 9/62*    (2022.01)
  *G06F 21/32*   (2013.01)
  *F27D 21/02*   (2006.01)

(52) U.S. Cl.
  CPC ...... *G06K 9/6267* (2013.01); *F27D 2021/026* (2013.01)

(58) Field of Classification Search
  CPC .. F24C 7/08; F24C 7/085; F27D 21/02; F27D 2021/026; G06F 21/32; G06K 9/6267; G06K 9/6271; G06V 10/454; G06V 10/82; G06V 20/68; G06V 10/764; A47J 36/321; H04N 7/183
  See application file for complete search history.

(56) References Cited

U.S. PATENT DOCUMENTS

| | | | |
|---|---|---|---|
| 2016/0220059 A1* | 8/2016 | Wachtler | A47J 27/10 |
| 2016/0278563 A1* | 9/2016 | Choudhary | A47J 36/321 |
| 2017/0290095 A1* | 10/2017 | Pereira | G05D 23/1917 |
| 2018/0232689 A1* | 8/2018 | Minvielle | G06T 7/11 |
| 2018/0292092 A1* | 10/2018 | Bhogal | F24C 7/087 |
| 2018/0324908 A1* | 11/2018 | Denker | G06V 10/40 |
| 2019/0110638 A1* | 4/2019 | Li | G06N 20/00 |
| 2019/0200797 A1* | 7/2019 | Diao | A47J 27/00 |
| 2019/0215915 A1* | 7/2019 | Minvielle | F24C 7/085 |
| 2020/0121125 A1* | 4/2020 | Zito | A47J 37/12 |
| 2020/0351557 A1* | 11/2020 | Drake | G09B 19/0092 |

\* cited by examiner

COOKING APPARATUS FOR DETERMINING COOKED-STATE OF COOKING MATERIAL AND CONTROL METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0165571, filed on Dec. 12, 2019, the contents of which are hereby incorporated by reference herein in its entirety.

BACKGROUND

1. Technical Field

The present disclosure relates to an apparatus and method for controlling a heater to appropriately perform cooking depending on a cooking material, an internal temperature and an external temperature of the cooking material that is being cooked, the state of the surface of the cooking material, or the like.

2. Description of Related Art

The following description is only for the purpose of providing background information related to embodiments of the present disclosure, and the contents to be described do not necessarily constitute related art.

When food is cooked using a cooking apparatus such as an oven, a microwave, or an air fryer, a user directly inputs, for example, a food type, a cooking method, and setting information corresponding to a recipe. However, it is complicated to set a cooking apparatus due to the great variety of recipes, and even different pieces of the same type of cooking material have different characteristics, such as area or thickness. Thus, it may not always be appropriate to use a cooking apparatus according to a standardized recipe.

In particular, there has been increasing interest in technology for adjusting the intensity of a heater for heating a cooking material depending on a change in the surface of the cooking material, which indicates the cooked state of the cooking material, an internal temperature and an external temperature of the cooking material, or the like, to thus automatically perform cooking according to the preference of a food consumer for the cooking material.

As related art, U.S. Patent Registration No. 9,933,165B2 discloses technology related to an "Oven comprising a camera". The aforementioned document discloses technology for photographing food through a camera mounted in the oven, and transmitting the captured image of the food to an electronic device so that a user may check the cooked state of the food through the image.

The aforementioned document discloses technology related to the structure and the configuration of a camera for capturing an image of food that is being cooked in a high-temperature environment. However, the aforementioned document does not disclose or suggest technology for adjusting the degree of heating of a cooking material depending on a change in the surface of the cooking material, an internal temperature and an external temperature of the cooking material, or the like.

In addition, Korean Patent Application Publication No. 10-2015-0049026 discloses technology related to a "thermal camera microwave". The aforementioned document discloses technology for preventing a fire in a microwave oven using a thermal camera mounted in the microwave oven to check the temperature of the food in the microwave oven.

The aforementioned document discloses technology for enabling checking of the temperature in the microwave oven with the naked eye, thereby enabling not only checking of the cooked state of a cooking material but also prevention of a fire in the microwave oven due to a high temperature. However, the aforementioned document does not disclose or suggest technology for adjusting the degree of heating of a cooking material depending on a change in the surface of the cooking material, an internal temperature and an external temperature of the cooking material, or the like.

To overcome the aforementioned limitations, there is a need for a solution for controlling a cooking apparatus to appropriately perform cooking depending on an internal temperature and an external temperature of a cooking material, the state of the surface of the cooking material, or the like.

The background art described above may be technical information retained by the present inventors in order to derive the present disclosure or acquired by the present inventors along the process of deriving the present disclosure, and thus is not necessarily a known art disclosed to the general public before the filing of the present application.

SUMMARY OF THE INVENTION

An aspect of the present disclosure is to provide a cooking apparatus and a method for controlling the same for enabling appropriate cooking by adjusting the degree of heating of a cooking material, which is being cooked in the cooking apparatus, depending on a change in the surface of the cooking material, an internal temperature and an external temperature of the cooking material, or the like.

Another aspect of the present disclosure is to provide a cooking apparatus and a method for controlling the same for storing information on a user who uses the cooking apparatus and a recipe that the user uses to cook a cooking material, thereby enabling cooking of a cooking material based on the stored information without requiring the user to input the recipe for the cooking material.

Aspects of the present disclosure are not limited to the above-mentioned aspects, and other aspects and advantages of the present disclosure, which are not mentioned, will be understood through the following description, and will become apparent from the embodiments of the present disclosure. It is also to be understood that the aspects of the present disclosure may be realized by means and combinations thereof set forth in claims.

A cooking apparatus according to an embodiment of the present disclosure includes a main body forming the exterior of the cooking apparatus, a camera configured to photograph a cooking material being cooked in the main body, a heater configured to cook the cooking material, and a processor configured to communicate with the camera and the heater to control the operation of the cooking apparatus.

The processor may apply a cooked-state determination neural network to an image captured by the camera to determine the cooked state of the cooking material, and may control the heater to cook the cooking material in accordance with a preset recipe based on the determined cooked state of the cooking material.

A method for controlling a cooking apparatus according to an embodiment of the present disclosure includes photographing a cooking material disposed in a main body forming the exterior of the cooking apparatus, applying a cooked-state determination neural network to a captured image of the cooking material to determine the cooked state of the cooking material, and controlling a degree of heating of the cooking material such that the cooking material is cooked in accordance with a preset recipe based on the determined cooked state of the cooking material.

According to the present disclosure, a heater configured to cook a cooking material, a camera configured to capture at least one image of the cooking material being cooked in the cooking apparatus and a processor configured to input the captured at least one image to a cooked-state determination neural network to determine a cooked state of the cooking material and control the heater to cook the cooking material in accordance with a preset recipe based on the determined cooked state of the cooking material.

According to the present disclosure, cooking a cooking material, capturing at least one image of the cooking material being cooked in the cooking apparatus, input the captured at least one image to a cooked-state determination neural network to determine a cooked state of the cooking material and controlling the cooking of the cooking material in accordance with a preset recipe based on the determined cooked state of the cooking material.

Other aspects and features than those described above will become apparent from the following drawings, claims, and detailed description of the present disclosure.\

According to a cooking apparatus and a cooking apparatus control method according to embodiments of the present disclosure, a change in the surface of a cooking material, a change in an internal temperature and an external temperature of a cooking material, and the like may be analyzed, and thus the cooking material may be cooked in accordance with the state thereof.

In particular, the cooking material may be analyzed using an RGB camera and a thermal camera mounted inside the cooking apparatus. Specifically, the state of the surface of the cooking material may be determined through the RGB camera, and the internal temperature and the external temperature of the cooking material may be determined through the thermal camera, thereby determining whether the cooking material is in the state of being capable of being cooked.

In addition, according to embodiments of the present disclosure, information on a user who uses the cooking apparatus and a recipe that the user uses to cook a cooking material may be stored in the cooking apparatus. As a result, the cooking apparatus enables cooking of a cooking material based on the stored information without requiring the user to input the recipe for the cooking material.

The effects of the present disclosure are not limited to those mentioned above, and other effects not mentioned may be clearly understood by those skilled in the art from the above description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
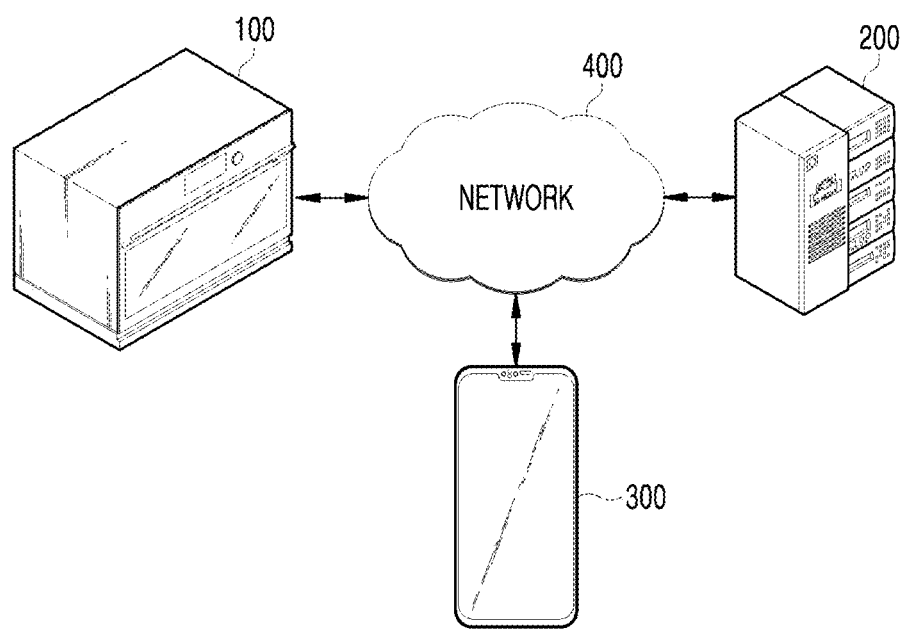
FIG. 1 is a diagram illustrating an environment for controlling a cooking apparatus according to an embodiment of the present disclosure.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, a cooking apparatus according to an embodiment of the present disclosure will be described in detail with reference to the accompanying drawings.

Figure 2:
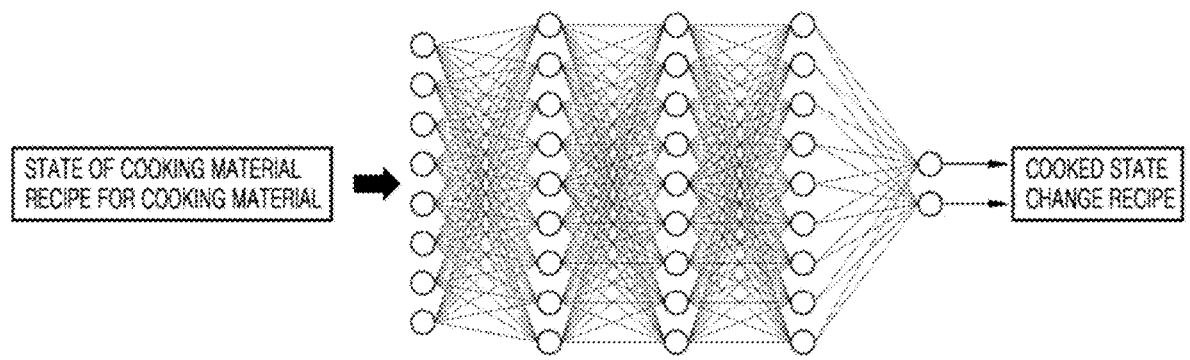
FIG. 2 is a diagram illustrating a process of cooking a cooking material using an artificial intelligence model according to an embodiment of the present disclosure.

FIG. 1 is a diagram illustrating an environment for controlling a cooking apparatus according to an embodiment of the present disclosure, and FIG. 2 is a diagram illustrating a process of cooking a cooking material using an artificial intelligence (AI) model according to an embodiment of the present disclosure.

Referring to the drawings, a cooking apparatus 100 according to an embodiment of the present disclosure may include a camera for photographing a cooking material that is being cooked by the cooking apparatus 100.

In addition, the cooking apparatus 100 may be configured to predict the state of the surface of the cooking material and an internal temperature and an external temperature of the cooking material through a captured image of the cooking material, and control a heater based thereon so that the cooking material is appropriately cooked.

In more detail, the environment for controlling the cooking apparatus 100 according to an embodiment of the present disclosure may be established such that the cooking apparatus 100, a server 200, an electronic device 300, and a network 400 communicate with each other.

The electronic device 300 may include user equipment and an artificial intelligence (AI) assistant speaker having a photography function. The AI assistant speaker may be a device that functions as a gateway in home automation, and may enable control of various home appliances using speech recognition.

The electronic device 300 may be implemented as a stationary terminal and a mobile terminal, such as a mobile phone, a projector, a mobile phone, a smartphone, a laptop computer, an electronic device for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, and a digital signage.

Further, the electronic device 300 may be implemented as various home appliances for household use, and may be also applied to a stationary or mobile robot.

The cooking apparatus 100 may cook a cooking material according to a recipe that is directly inputted by a user who uses the cooking apparatus 100, or alternatively, may be an embedded-system-type apparatus that cooks a cooking material using a wireless communication function. For example, the cooking apparatus 100 may receive cooking instructions through the electronic device 300 and/or the server 200, and may perform cooking in response thereto.

The cooking apparatus 100 may include an appliance such as an electric oven, a microwave cooktop, or an air fryer. In the following embodiments of the present disclosure, the case in which the cooking apparatus 100 is a microwave will be exemplified.

A user who cooks a cooking material may modify a recipe according to his or her preference. In this case, the cooking apparatus 100 according to the present disclosure may have an artificial intelligence (AI) function for cooking a cooking material according to the modified recipe of the user.

Although an example in which the cooking apparatus 100 has an AI function is described herein, the server 200 may have an AI function and may control the cooking apparatus 100 according to the cooking material.

The entity that controls the cooking apparatus 100 may be the user described above. The user may also control the cooking apparatus 100 through the electronic device 300.

The cooking apparatus 100 according to an embodiment of the present disclosure may transmit and receive data to and from the server 200, which is a learning device, through a 5G network. In particular, the electronic device 300 and the AI assistant speaker may perform data-communication with a learning device using at least one service among Enhanced Mobile Broadband (eMBB), ultra-reliable and low latency communications (URLLC), or massive machine type communications (mMTC) through a 5G network.

eMBB is a mobile broadband service, and provides, for example, multimedia contents and wireless data access. In addition, improved mobile services such as hotspots and wideband coverage for accommodating the rapidly growing mobile traffic may be provided through eMBB. Through a hotspot, high-volume traffic may be accommodated in an area where user mobility is low and user density is high. A wide and stable wireless environment and user mobility can be secured by wideband coverage.

The URLLC service defines requirements that are far more stringent than existing LTE in terms of reliability and transmission delay of data transmission and reception, and corresponds to a 5G service for production process automation in fields such as industrial fields, telemedicine, remote surgery, transportation, safety, and the like.

Massive machine-type communications (mMTC) is a transmission delay-insensitive service that requires a relatively small amount of data transmission. mMTC enables a much larger number of electronic devices, such as sensors, than general mobile cellular phones to be simultaneously connected to a wireless access network. In this case, the cost of the communication module of the electronic device needs to be low and improved power efficiency and power reduction technique are necessary to allow the terminal to operate for several years without replacing or recharging the battery.

As described above, the cooking apparatus 100 according to an embodiment of the present disclosure is an apparatus that photographs a cooking material and predicts, based on the captured image of the cooking material, the state of the surface of the cooking material, for example, whether the cooking material needs to be cooked, whether the cooking material has been cooked to a certain degree, or the like. In addition, the cooking apparatus 100 according to an embodiment of the present disclosure is an apparatus that estimates an internal temperature and an external temperature of the cooking material based on the captured image of the cooking material and controls the temperature and time required to heat the cooking material to cook the same.

To this end, the cooking apparatus 100 according to the present disclosure may store or include various learning models, such as a deep neural network or other types of machine learning models, to which AI technology is applied, or technology including the same.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

Specifically, ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a previous layer.

ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, the multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be a representative artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Representative examples of parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, a learning method of the artificial neural network will be described.

The learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, the unsupervised learning may be a learning method that trains an artificial neural network to discover a pattern within given training data and perform classification by using the discovered pattern, rather than by using a correlation between given training data and labels corresponding to the given training data.

Examples of unsupervised learning may include clustering and independent component analysis.

Examples of artificial neural networks using the unsupervised learning may include a generative adversarial network (GAN) and an autoencoder (AE).

GAN is a machine learning method in which two different artificial intelligences, a generator and a discriminator, improve performance through competing with each other.

The generator may be a model creating new data that generate new data based on true data.

The discriminator may be a model recognizing patterns in data that determines whether inputted data is from the true data or from the new data generated by the generator.

Furthermore, the generator may receive and learn data that has failed to fool the discriminator, while the discriminator may receive and learn data that has succeeded in fooling the discriminator. Accordingly, the generator may evolve so as to fool the discriminator as effectively as possible, while the discriminator may evolve so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. In this case, since the number of nodes in the output layer is greater than the number of nodes in the hidden layer, the dimensionality of the data increases, thus data decompression or decoding may be performed.

Furthermore, in the AE, the inputted data may be represented as hidden layer data as interneuron connection strengths are adjusted through learning. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves inferring the label of unlabeled training data, and then using this inferred label for learning. This technique may be used advantageously when the cost associated with the labeling process is high.

Reinforcement learning may be based on a theory that given the condition under which a reinforcement learning agent can determine what action to choose at each time instance, the agent may find an optimal path based on experience without reference to data.

Reinforcement learning may be performed primarily by a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

The hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. The one-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be used to minimize a cost function, and examples of such learning optimization algorithms may include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

The SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In the SGD, the momentum and NAG may also include methods that increase optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network may include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, the hyperparameters may be set to various values experimentally to learn artificial neural networks, and may be set to optimal values that provide stable learning rate and accuracy of the learning result.

The estimation of a state of the object to be heated may be more sophisticated using the above methods.

In order to generate a deep neural network model to be used for embodiments of the present disclosure, various schemes may be used. In the case of supervised learning, the following training process may be performed as preliminary work.

In relation to an AI model required to perform a vision recognition function of recognizing a captured image of a cooking material, the cooking apparatus 100 according to an embodiment of the present disclosure may use a program associated with various AI algorithms stored in a local area and the server 200 in the processes of generating various AI models, training the models, evaluating the models, completing the models, and updating the models using personal data on the user.

The server 200 provides various services related to an AI model loaded in the cooking apparatus 100 in relation to the AI model described with regard to an embodiment of the present disclosure. Detailed description of the AI model will be made below. The server 200 may also provide various services required to recognize the cooking material.

The server 200 serves to collect learning data required to train various artificial intelligence models and train the artificial intelligence models using the collected data. When the various artificial intelligence models trained by the server 200 are completed by the evaluation, the electronic device 300 uses the various artificial intelligence models or the artificial intelligence models serve as principal agents to perform human body recognition, face recognition, and object recognition.

The network 400 can be any suitable communication network including a wired and wireless network, for example, a local area network (LAN), a wide area network (WAN), the Internet, an intranet, an extranet, and a mobile network, for example, cellular, 3G, LTE, 5G, Wi-Fi networks, an ad hoc network, and a combination thereof.

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. Access to the network 400 can be provided via one or more wired or wireless access networks.

Figure 3:
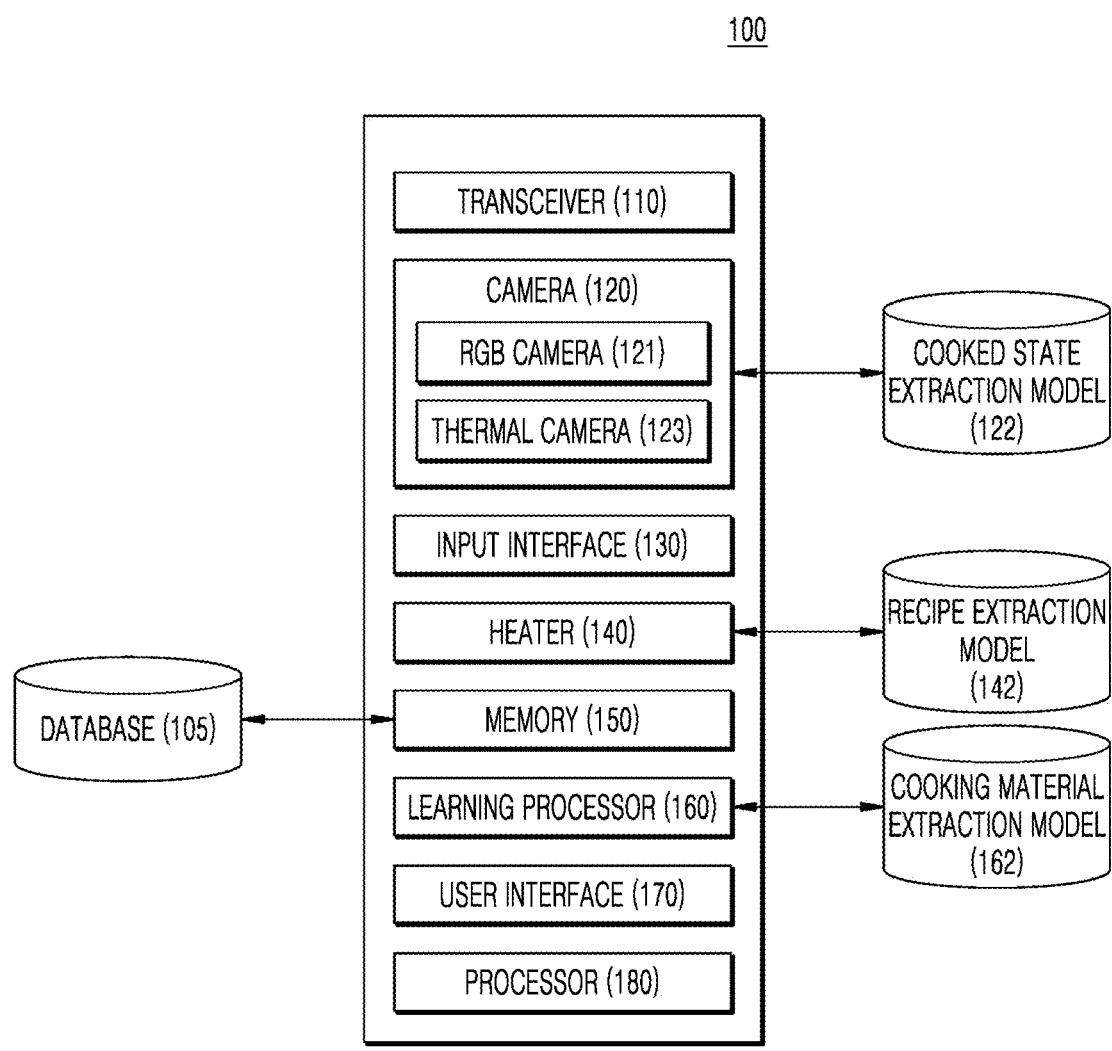
FIG. 3 is a block diagram illustrating the configuration of the cooking apparatus according to an embodiment of the present disclosure.
Figure 4:
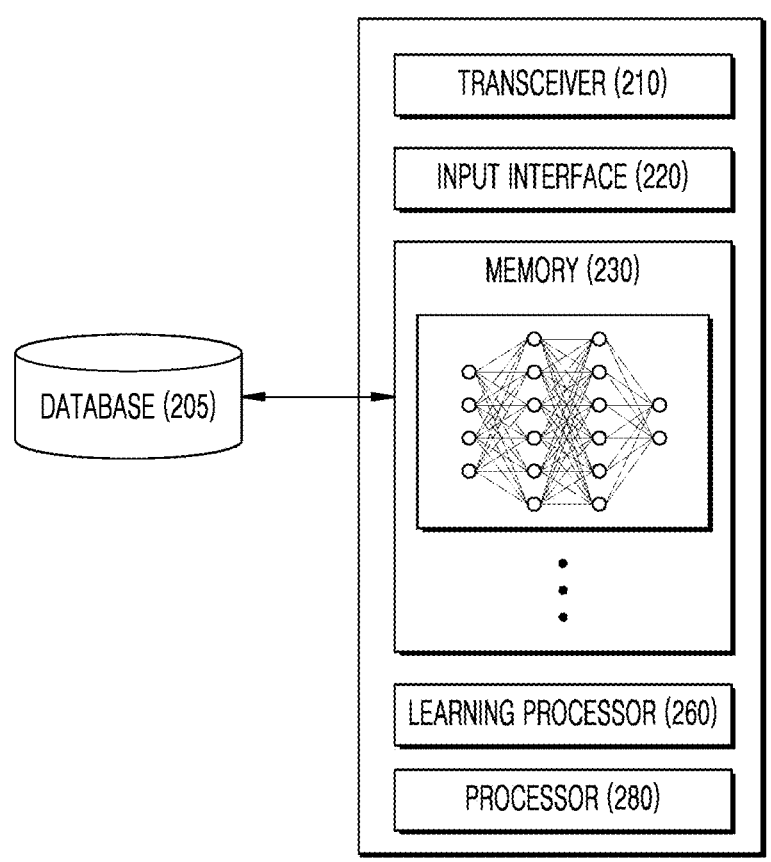
FIG. 4 is a block diagram of a server illustrating the configuration of the server according to an embodiment of the present disclosure.
Figure 5:
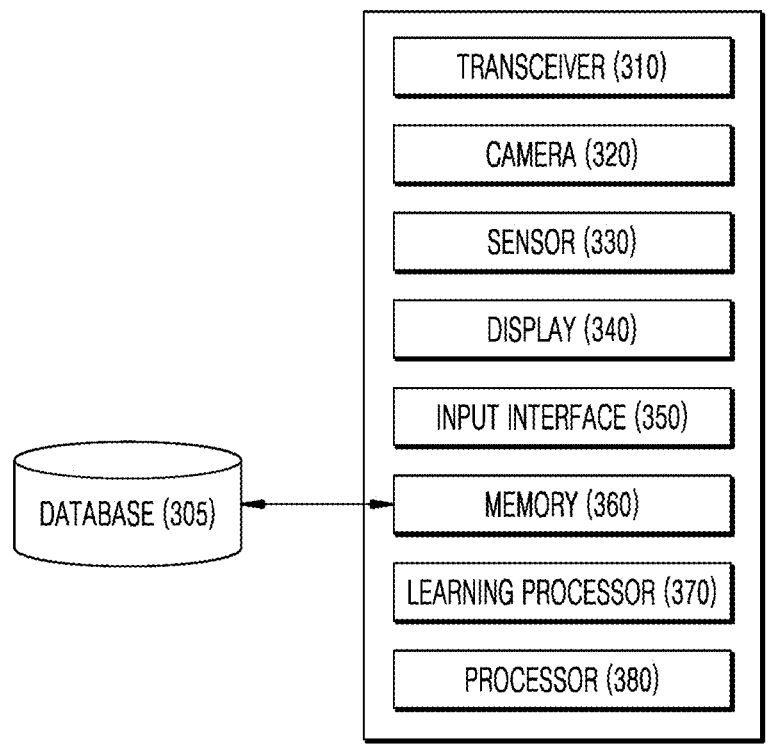
FIG. 5 is a block diagram of an electronic device illustrating the configuration of the electronic device according to an embodiment of the present disclosure.

FIG. 3 is a block diagram illustrating the configuration of the cooking apparatus according to an embodiment of the present disclosure, FIG. 4 is a block diagram of the server illustrating the configuration of the server according to an embodiment of the present disclosure, and FIG. 5 is a block diagram of the electronic device illustrating the configuration of the electronic device according to an embodiment of the present disclosure.

The cooking apparatus 100 according to an embodiment of the present disclosure may include a trained model loaded therein. The trained model may be embodied in hardware, software, or a combination of hardware and software, and when the trained model is partially or entirely embodied in software, one or more commands for configuring the trained model may be stored in any one of processors.

In detail, referring to the drawings, the cooking apparatus 100 according to an embodiment of the present disclosure may include a main body 101 (refer to FIG. 8), a transceiver 110, a camera 120, an input interface 130, a heater 140, a memory 150, and a learning processor 160.

The main body 101 (refer to FIG. 8) may form the exterior of the cooking apparatus 100 and may include a space for disposing a cooking material therein. The main body 101 may be formed in any of various shapes according to the conditions under which the cooking apparatus 100 is embodied. The present disclosure is not limited to any specific shape of the main body 101.

The cooking apparatus 100 according to an embodiment of the present disclosure includes a transceiver 110 so as to enable the server 200, the electronic device 300, and the network 400 to communicate with each other.

The transceiver 110 may receive broadcast signals and/or broadcast-related information from an external broadcast management server through a broadcast channel.

The transceiver 110 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

Further, the transceiver 110 may transmit and receive wireless signals using a wireless internal module, which is installed inside or outside the cooking apparatus 100, over a communication network established based on wireless internet technologies.

The wireless Internet technologies are, for example, Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The transceiver 110 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The camera 120 may photograph a cooking material that is being cooked in the main body 101. When photographing the cooking material, the camera 120 may photograph the surface of the cooking material and an internal temperature and an external temperature of the cooking material. To this end, the camera 120 may include a red-green-blue (RGB) camera 121 for photographing the state of the surface of the cooking material and a thermal camera 123 for extracting temperature information of the cooking material.

The RGB camera 121 and the thermal camera 123 may be installed inside and/or outside the cooking apparatus 100. When the RGB camera 121 and the thermal camera 123 are installed inside the cooking apparatus 100, the interior of the cooking apparatus 100 may be constructed so as to endure a high temperature in order to prevent the cameras from malfunctioning due to the high-temperature heat generated during the operation of the cooking apparatus 100.

A cooked-state determination neural network may be applied to an image of the cooking material captured by the camera 120 in order to determine the cooked state of the cooking material. The heater 140 may be controlled to cook the cooking material based on a preset recipe and in consideration of the cooked state of the cooking material determined in this manner.

In detail, the camera 120 determines the type of cooking material by applying an object classifier to the image of the surface of the cooking material captured by the RGB camera 121.

The RGB camera 121 photographs the exterior, color, and the like of the cooking material. The captured image of the cooking material is compared with the image of the surface of each kind of cooking material stored in a database 105 through learning, and information on the corresponding cooking material is extracted. The photographed cooking material is cooked based on the extracted information on the cooking material.

In particular, the object classifier may analyze a change in the surface of the cooking material, and may predict the type of cooking material, the cooking stage, and the like. As described above, the RGB camera 121 photographs the surface of the cooking material. The type of cooking material that is photographed may be determined based on the learned information. Alternatively, even when cooking materials are of the same type, recipes thereof may be different. For example, when the surface of instant rice is photographed, the instant rice may be cooked in accordance with a recipe that is set differently depending on the brand of the instant rice, the presence or absence of a precooked portion, or the like. Therefore, the object classifier may be trained to predict the cooked state of the cooking material through the captured image of the surface of the cooking material, and may set a recipe for cooking the cooking material differently in accordance with the characteristics of the change in the surface of the cooking material based on the trained model.

In addition, the RGB camera 121 may capture an image of the completely cooked cooking material. Whether the cooking material has been appropriately cooked may be determined through the captured image of the surface of the cooked cooking material. To this end, the camera 120 may apply the cooked-state determination neural network to the image of the cooked cooking material to determine the state of the cooking material through a change in the surface of the cooked cooking material.

In summary, the cooked-state determination neural network analyzes a change between an image of the cooking material before cooking and an image of the cooking material after cooking. In this case, the cooked-state determination neural network may reprocess the image of the cooking material before cooking and the image of the cooking material after cooking through rotation, parallel translation, brightness adjustment, zooming in/out, or the like to obtain new images, and may add data related thereto to a training processor (not shown) so that the training processor learns the same. As such, since the image of the cooking material before cooking and the image of the cooking material after cooking are generated and the characteristics of the change in the surface of the cooking material are learned, it is possible to determine whether the cooking material has been appropriately cooked.

Instant rice will now be described as an example. A cooked state extraction model 122 learns in advance the appearance of the surface of the instant rice before cooking and the appearance of the surface of the instant rice after cooking, and determines whether the image of the cooked instant rice matches the learned information. In this case, upon determining that the image of the cooked instant rice matches the image of the surface of the instance rice before cooking based on the learned information, the cooked state extraction model 122 may determine that the instant rice has not been sufficiently cooked. Based on the determination result, the cooked state extraction model 122 may generate an alarm indicating that further cooking of the instant rice is necessary, or may further cook the instant rice until the captured image of the instant rice matches the learned information.

In addition, the camera 120 may apply an image-processing neural network to the image of the cooking material captured by the thermal camera 123 to detect an internal temperature and an external temperature of the cooking material.

The thermal camera 123 is a device that seeks and detects heat to enable a user to check the temperature of an object with the naked eye. Utilizing the thermal camera 123, an internal temperature and an external temperature of the cooking material may be checked, and whether the cooking material has been completely cooked may be determined.

In particular, the image-processing neural network may generate a numerical value representing each pixel value of the image of the cooking material in order to analyze an internal temperature and an external temperature of the cooking material, and may determine the cooked state of the cooking material based thereon. As described above, the thermal camera 123 captures an image representing an internal temperature and an external temperature of the cooking material. Even if the cooking materials that are photographed are of the same type, the cooking materials are cooked differently depending on the cooking time and the recipe. In other words, when the cooking material is cooked in accordance with different recipes, the internal temperature and the external temperature of the cooking material after cooking may be measured differently. Utilizing this phenomenon, the image-processing neural network may estimate the internal temperature and the external temperature of the cooking material based on the image captured by the thermal camera 123, which represents the internal temperature and the external temperature of the cooking material, and may determine the degree to which the cooking material has been cooked or whether the cooking procedure needs to be further performed based on the estimated internal temperature and external temperature of the cooking material.

The thermal camera 123 may also capture an image of the completely cooked food. That is, whether the cooking material has been appropriately cooked may be determined based on the captured image of the cooked food, which represents an internal temperature and an external temperature of the cooked food. To this end, the image-processing neural network may be trained to apply the image-processing neural network to the image of the cooked food and to determine whether the internal temperature and the external temperature of the cooked food fall within the temperature range that is preset based on the recipe for the cooking material.

In the case of cooking, for example, instant rice, the cooked state extraction model 122 learns in advance a thermal image that represents an internal temperature and an external temperature of the instant rice before cooking and a thermal image that represents an internal temperature and an external temperature of the instant rice after cooking.

Thereafter, the cooked state extraction model 122 determines whether the thermal image that represents an internal temperature and an external temperature of the cooked instant rice matches the learned information. In this case, upon determining that the thermal image that represents an internal temperature and an external temperature of the cooked instant rice is similar to or somewhat matches the thermal image that represents an internal temperature and an external temperature of the instant rice before cooking based on the learned information, the cooked state extraction model 122 determines that the instant rice has not been sufficiently cooked. In this case, the cooked state extraction model 122 may determine whether the internal temperature and the external temperature of the cooked instant rice fall within the temperature range that is preset based on the learned information, and may determine whether the instant rice has been sufficiently cooked. Based on the determination result, the cooked state extraction model 122 may generate an alarm indicating that further cooking of the instant rice is necessary, or may further cook the instant rice until the captured image of the instant rice matches the learned information.

The camera, which captures an image of the cooking material, may be used to input image information (or an image signal), audio information (or an audio signal), data, or information inputted by a user. In order to input image information, one or more cameras may be provided inside or outside the cooking apparatus 100.

An image or the like of the cooking material obtained by the camera may be processed into a frame, and the processed frame may be displayed on the display 104 or may be stored in the memory 150.

The input interface 130 is configured to receive information inputted by a user. Specifically, a user may input a recipe for a cooking material to the cooking apparatus 100 through the input interface 130 to control the operation of the heater 140 of the cooking apparatus 100 so that the cooking material is cooked in accordance with the input recipe.

The input interface 130 may include a mechanical input interface (or a mechanical key, for example, a button, a dome switch, a jog wheel, a jog switch, or the like mounted in the front surface of the main body 101) and a touch type input interface. For example, the touch type input interface may be formed by a virtual key, a soft key, or a visual key which is disposed on the touchscreen through a software process or a touch key which is disposed on a portion other than the touchscreen.

The heater 140 is a device for supplying heat for cooking a cooking material. The heater 140 may be embodied as an electromagnetic wave, a hot wire, or the like depending on the type of the cooking apparatus 100. As described above, a microwave is exemplified in an embodiment of the present disclosure, and thus, an example in which the heater 140 according to an embodiment of the present disclosure is embodied as an electromagnetic wave will be described.

A recipe extraction model 142 may be loaded in the heater 140. The recipe extraction model 142 may extract a recipe for cooking a cooking material based on the state of the cooking material, the state of the cooked food, and the like, which have been extracted from the camera 120.

The memory 150 may store information on each kind of cooking material, image information of each kind of cooking material, thermal image information representing an internal temperature and an external temperature of each kind of cooking material, and recipe information of each kind of cooking material, and may further store a program corresponding to each recipe.

In addition, the memory 150 may further store a cooking time of the cooking material and additional recipe information inputted by a user through the input interface 130. In detail, on the assumption that the time required to cook instant rice is 2 minutes, the instance rice may be cooked based on an image thereof, a thermal image representing an internal temperature and an external temperature thereof, and a stored recipe. When the cooking is completed in accordance with the recipe, the user may increase the cooking time. Alternatively, when the image of the cooked instant rice and the thermal image representing the internal temperature and the external temperature of the cooked instant rice do not match the stored information on cooked instant rice, the cooking may be further performed. Information on this additional cooking procedure may be stored in the memory, and thus, even if the user does not separately input information, it may be possible to automatically cook a related product according to user preference.

To this end, the memory 150 may further store personal information of a user who uses the cooking apparatus 100. The personal information of a user may be, for example, fingerprint, facial, or iris information of the user. Due to the stored personal information of the user, the cooking material may be cooked according to a user preference.

In addition, the memory 150 may store data for supporting various functions of the cooking apparatus 100.

In detail, the memory 150 may store a plurality of application programs (or applications) that are executed in the cooking apparatus 100, data for operation of the cooking apparatus 100, commands, and data for operation of the learning processor 160 (for example, at least one piece of algorithm information for machine learning).

In addition, the memory 150 may store therein a model trained by the learning processor 160, to be described below. If necessary, the memory 150 may store the trained model by dividing the model into a plurality of versions depending on a training timing or a training progress.

In this case, the memory 150 may store input data obtained from the camera, learning data (or training data) used for model learning, a learning history of the model, and so forth.

The input data stored in the memory 150 may be not only data which is processed to be suitable for the model learning, but may also itself be unprocessed input data.

The memory 150 will now be described in more detail. Various computer program modules may be loaded in the memory 150. The scope of computer programs loaded in the memory 150 may include application programs as well as system programs for managing an operating system and hardware.

The learning processor 160 may train a model configured with an artificial neural network using an image of a cooking material.

For example, the learning processor 160 may determine the type of cooking material, extracted from the camera 120, using a cooking material extraction model 162. In detail, the cooking material extraction module 162 may learn information on each kind of cooking material collected from the memory 150.

The learning processor 160 repeatedly trains the artificial neural network using various learning techniques to determine optimized model parameters of the artificial neural network.

In this specification, the artificial neural network which is trained using training data to determine parameters may be referred to as a learning model or a trained model.

In this case, the trained model may be used to deduce a result for the new input data, rather than the training data.

The learning processor 160 may be configured to receive, classify, store, and output information to be used for data mining, data analysis, intelligent decision making, and machine learning algorithms and techniques.

The learning processor 160 may include one or more memories configured to store data which is received, detected, sensed, generated, previously defined, or output by another component, device, the electronic device 300, or a device which communicates with the electronic device 300.

In addition, the learning processor 160 may be configured to store data in one or more databases to identify, index, categorize, manipulate, store, search, and output data in order to be used for supervised or non-supervised learning, data mining, predictive analysis, or used in the other machine.

Information stored in the learning processor 160 may be used by the processors driving the cooking apparatus 100 or by one or more other controllers using an arbitrary one of various different types of data analysis algorithms and machine learning algorithms.

As an example of such algorithms, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The processors described above may control the components of the cooking apparatus 100, and may control driving of the cooking apparatus 100 using the components.

In detail, the processors may determine or predict an operation for executing the cooking apparatus 100 based on information determined or generated using data analysis and a machine learning algorithm. To this end, the processors may request, search for, receive, or use data of the learning processor 160, and may control the cooking apparatus 100 to execute a predicted operation or an operation determined to be appropriate among at least one executable operation.

The processors may perform various functions for embodying emulation (i.e. knowledge-based systems, inference systems, and knowledge acquisition systems). This may be applied to various types of systems (for example, fuzzy logic systems) including, for example, adaptive systems, machine learning systems, and artificial neural networks.

In addition, the processors may include sub modules which enable operations involving speech and natural language speech processing, such as an I/O processing module, an environmental condition module, a speech to text (STT) processing module, a natural language processing module, a workflow processing module, and a service processing module.

Each of the sub modules may have access to one or more systems or data and model of the cooking apparatus 100, or to a subset or superset thereof. Further, each of the sub modules may provide various functions including a glossarial index, user data, a workflow model, a service model, and an automatic speech recognition (ASR) system.

In some exemplary embodiments, based on the data of the learning processor 160, the processors may be configured to detect and sense requirements based on contextual conditions expressed by user input or natural language input or a user's intention.

The processors may actively derive and obtain information required to completely determine the requirement based on the contextual conditions or the user's intention. For example, the processors may actively derive information required to determine the requirements, by analyzing past data including historical input and output, pattern matching, unambiguous words, and input intention.

The processors may determine task flow for executing a function responding to requirements based on the contextual conditions or the user's intention.

The processors may be configured to collect, sense, extract, detect and/or receive a signal or data which is used for data analysis and a machine learning task through one or more sensing components in the cooking apparatus 100, to collect information for processing and storing in the learning processor 160.

The information collection may include sensing information by a sensor, extracting of information stored in the memory 150, or receiving information from other electronic devices, an entity, or an external storage device through a transceiver.

In addition, the processors may collect use history information related to the use of the cooking apparatus 100, and may store the use history information in the memory 150. The optimum match for executing a specific function may be determined using the stored use history information and predictive modeling.

The processors may collect the information in real time, process or classify the information (for example, a knowledge graph, a command policy, a personalized database, or a conversation engine), and store the processed information in the memory 150 or the learning processor 160.

When an operation of the cooking apparatus 100 is determined based on data analysis and a machine learning algorithm and technology, the processors may control the components of the cooking apparatus 100 in order to execute the determined operation. Further, the processors may control terminals in response to the control command to perform the determined operation.

When a specific operation is performed, the processors analyze history information indicating execution of the specific operation through the data analysis and the machine learning algorithm and technology, and update the information which is previously learned based on the analyzed information.

Thus, the processors may increase the accuracy of the future performance of data analysis and a machine learning algorithm and scheme based on the updated information along with the learning processor 160.

The main body 101 of the cooking apparatus further includes a display 104. The display 104 may display a cooking procedure of a cooking material through any of various methods, such as an image, a picture, or the actual cooked state.

The process in which the cooking apparatus 100 configured as described above cooks a cooking material will now be described. First, the RGB camera 121 and the thermal camera 123 capture an image of the surface of a cooking material and a thermal image representing an internal temperature and an external temperature of the cooking material.

Thereafter, cooking is performed in accordance with a recipe corresponding to the type of cooking material and the degree to which the cooking material has been cooked. When the cooking material is being cooked, an image of the surface of the cooked cooking material and a thermal image representing an internal temperature and an external temperature of the cooked cooking material are captured. The surface of the cooking material may change as the cooking is performed, and thus whether the cooking material has been appropriately cooked may be determined based on the degree to which the surface of the cooking material has changed. Further, the internal temperature and the external temperature of the cooking material may change as the cooking is performed, and thus whether the cooking material has been appropriately cooked may be determined based on whether the internal temperature and the external temperature of the cooked cooking material match the prestored internal temperature and external temperature of the cooked cooking material.

In this case, when it is determined that the cooking material has not been sufficiently cooked, the cooking material may be additionally cooked.

Referring to FIG. 4, the server 200 may include a transceiver 210, an input interface 220, a memory 230, a learning processor 260, and a processor 280.

The transceiver 210 of the server 200 may have a configuration corresponding to the configuration of the transceiver 110 of the cooking apparatus 100. That is, the transceiver 210 may transmit and receive data to and from other devices through wired/wireless communication or an interface.

The input interface 220 may be a component corresponding to the input interface 130 of the cooking apparatus 100. In detail, the input interface 220 may receive and obtain data on a recipe for a cooking material input to the cooking apparatus 100 by the user.

The input interface 220 may obtain input data for acquiring an output, using training data for model learning and a trained model.

In particular, the input interface 220 may acquire unprocessed input data, in which case the processors of the server 200 may pre-process the acquired data to generate training data to be inputted to model learning or pre-processed input data.

In this case, pre-processing of the input data, which is performed by the input interface 130, may mean extraction of an input feature from the input data.

The memory 230 may be a component corresponding to the memory 150 of the cooking apparatus 100.

The memory 230 may store therein a model (or an artificial neural network) that is being trained or has been trained through the learning processor 240. When the model is updated through the learning, the memory 230 may store the updated model therein.

The database 205 may store input data obtained from the input interface 220, learning data (or training data) used to train a model, a learning history of the model, and so forth.

In addition, the input data stored in the database 205 may not only be data that is processed to be suitable for the model learning, but may also itself be unprocessed input data.

The learning processor 240 may be a component corresponding to the learning processor 160 of the cooking apparatus 100.

The learning processor 240 may train the artificial neural network 231a using training data or a training set.

The learning processor 240 may immediately obtain data that is acquired by pre-processing input data through the input interface 220 to train the artificial neural network, or may obtain the pre-processed input data stored in the database 205 to train the artificial neural network.

Specifically, the learning processor 240 repeatedly trains the artificial neural network using the aforementioned various learning techniques to determine optimized model parameters of the artificial neural network.

In this specification, the artificial neural network which is trained using training data to determine parameters may be referred to as a learning model or a trained model.

In addition, the server 200 may evaluate the artificial intelligence model and update the artificial intelligence model for better performance even after the evaluation, and provide the updated artificial intelligence model to the cooking apparatus 100. Here, the cooking apparatus 100 may also perform a series of operations, which are performed by the server 200, alone in a local area or through communication with the server 200. For example, the cooking apparatus 100 may train the AI model to learn a personal pattern of the user through training with the user's personal data, and thereby may update the AI model downloaded from the server 200.

The trained model of the server 200 according to an embodiment of the present disclosure may be embodied in hardware, software, or a combination of hardware and software, and when the trained model is partially or entirely embodied in software, one or more commands for configuring the trained model may be stored in any one of the processors.

Referring to FIG. 5, the electronic device 300 may include a transceiver 310, a camera 320, a sensor 330, a display 340, an input interface 350, a memory 360, a learning processor 370, and a processor 380.

The transceiver 310 of the electronic device 300 may receive cooking instructions generated in the cooking apparatus 100 or the server 200. The cooking apparatus 100 may be connected to the server 200 and the cooking apparatus 100 so as to communicate therewith using a short distance communication module such as Bluetooth or a wireless LAN, for example, a Wi-Fi module.

The camera 320 causes the images of the cooking material captured by the thermal camera 123 and the RGB camera 121 of the cooking apparatus 100 to be shown to the user. Since the completely cooked food is shown to the user through the camera 320, the user is capable of determining completion of cooking with the naked eye.

The sensor 330 may be connected to the temperature sensor of the cooking apparatus 100 so as to communicate therewith to receive the internal temperature of the cooking apparatus 100. The operation of the cooking apparatus 100 may be controlled according to the received internal temperature of the cooking apparatus 100.

The display 104 may display the process of cooking the cooking material that is being performed by the cooking apparatus 100.

Meanwhile, the user may directly execute the recipe for the cooking material through the electronic device 300. To this end, the recipe for the cooking material may be stored in the electronic device 300, and may be executed through the input interface 130.

That is, the user may search for the recipe for the cooking material, and may select the recipe for the cooking material through the electronic device 300 based on the search result to input the same. The cooking apparatus 100 may be operated in accordance with the input recipe to cook the cooking material.

The recipe for the cooking material may be stored in the memory 360. Further, the recipe for the cooking material may be learned through the learning processor 370. When the cooking material is shown to the camera 320, the recipe for the cooking material may be inputted through the input interface 130, and the cooking apparatus 100 may be operated to cook the cooking material in accordance with the input recipe.

A trained model may be loaded in the electronic device 300 according to the present disclosure. The trained model may be embodied in hardware, software, or a combination of hardware and software, and when the trained model is partially or entirely embodied in software, one or more commands for configuring the trained model may be stored in any one of the processors.

Figure 6:
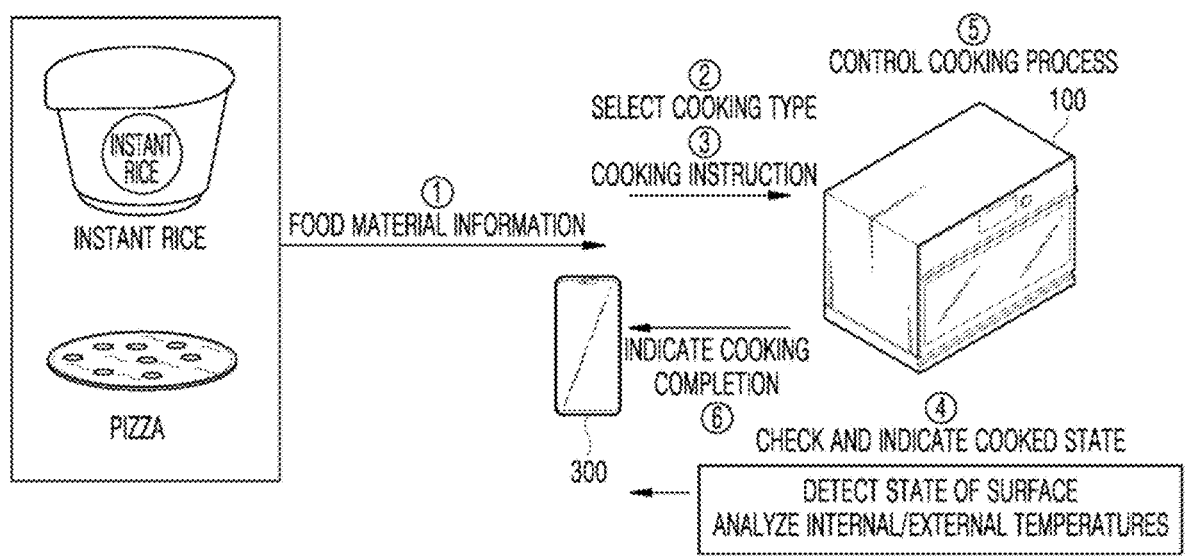
FIG. 6 is a flowchart illustrating a process of cooking a cooking material using the cooking apparatus according to an embodiment of the present disclosure.
Figure 7:
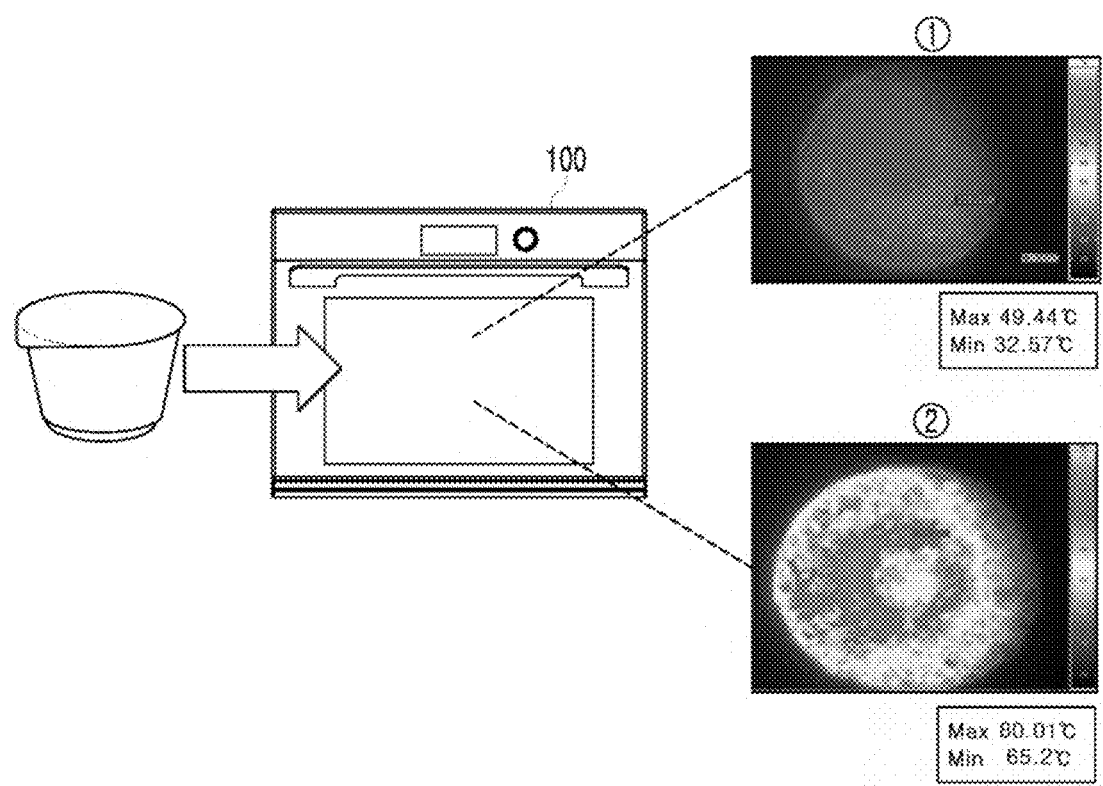
FIG. 7 is a diagram illustrating an example in which the cooked state of a cooking material is displayed on the cooking apparatus according to an embodiment of the present disclosure while the cooking material is being cooked.

FIG. 6 is a flowchart illustrating a process of cooking a cooking material using the cooking apparatus according to an embodiment of the present disclosure, and FIG. 7 is a diagram illustrating an example in which the cooked state of a cooking material is displayed on the cooking apparatus according to an embodiment of the present disclosure while the cooking material is being cooked.

Referring to the drawings, in the case in which a cooking material is instant food, semi-cooked food, or the like, information on an expiration date, a recipe, etc. for the cooking material may be written on the packaging of the cooking material (①  in FIG. 6).

In the case in which the cooking material contains a raw ingredient, the cooking apparatus 100 may receive information on the cooking material from a user (① in FIG. 6).

To this end, the RGB camera 121 and the thermal camera 123 mounted in the cooking apparatus 100 may capture an image of the surface of the cooking material and a thermal image representing an internal temperature and an external temperature of the cooking material to analyze information on the cooking material.

Specifically, the RGB camera 121 photographs the exterior, color, and the like of the cooking material. The captured image of the cooking material is compared with the image of the surface of each kind of cooking material stored in the database 105 through learning, and information on the corresponding cooking material is extracted. The photographed cooking material is cooked based on the extracted information on the cooking material.

In particular, the cooking stage of the cooking material may be predicted through a change in the surface of the cooking material photographed by the RGB camera 121. For example, even if the cooking materials that are photographed are of the same type, the recipes thereof may be different depending on the cooked state thereof, the brand thereof, or the like. That is, the recipes for cooking the cooking materials may be set differently depending on the aforementioned characteristics of the cooking materials.

The thermal camera 123 is a device that seeks and detects heat to enable a user to check the temperature of an object with the naked eye. Utilizing the thermal camera 123, an internal temperature and an external temperature of the cooking material may be checked, and whether the cooking material has been completely cooked may be determined.

Upon analyzing the information on the cooking material in this manner, the cooking apparatus 100 may detect a recipe based on the cooking material, the information on the cooking material, or the like. For example, in the case of instant rice, the cooking apparatus 100 may detect a recipe for cooking the instant rice, which is stored in, for example, a QR code or a barcode of the instant rice. In contrast, when an already cooked food is frozen and the frozen food is cooked (for example, pizza), the cooking apparatus 100 may detect and select a recipe for cooking the frozen food, stored in the cooking apparatus 100 and/or the server 200 (② in FIG. 6).

When the recipe is selected, a cooking instruction may be executed (③ in FIG. 6). In this case, the cooking instruction may automatically drive the cooking apparatus 100 according to the selected recipe to cook the cooking material. Alternatively, the user may input the recipe through the input interface 130 of the cooking apparatus 100 to execute the cooking instruction. In addition, cooking items according to the recipe may be displayed on the display 104 of the cooking apparatus 100, and the user may select the cooking items displayed on the display 104 to execute the cooking instruction.

In this case, the cooking apparatus 100 may enable the user to check the cooked state of the cooking material, or may indicate completion of cooking (④ in FIG. 6).

Specifically, the RGB camera 121 and the thermal camera 123 may capture an image of the completely cooked food. That is, the RGB camera 121 photographs the surface of the cooked food to determine whether the cooking material has been appropriately cooked. In addition, the thermal camera 123 photographs an image representing an internal temperature and an external temperature of the cooked food to determine whether the cooking material has been appropriately cooked.

Referring to ① and ② in FIG. 7, the thermal image representing the internal temperature and the external temperature of instant rice before cooking and the thermal image representing the internal temperature and the external temperature of instant rice after cooking are different from each other.

That is, the thermal image representing the internal temperature and the external temperature of the instant rice before cooking shows that the entire area of the instant rice is not heated to a high temperature (① in FIG. 7). Specifically, it can be seen that the temperature over the entire cooking material is less than 50° C.

In contrast, the thermal image representing the internal temperature and the external temperature of the instant rice after cooking shows that the temperature over the entire instant rice is sufficiently high and that the temperature is uniformly distributed over the entire area of the instant rice (② in FIG. 7).

Specifically, it can be seen that the maximum internal temperature of the cooked instant rice is approximately 80° C. and that the temperature of the surface thereof is higher than 65° C.

Based on this measurement result, when the thermal image representing the internal temperature and the external temperature of the cooked instant rice does not match the learned information (for example, the maximum temperature: 82° C., the minimum temperature: 63° C.), it may be determined that the cooked instant rice has not been completely cooked. In this case, the cooking apparatus 100 may be operated to additionally cook the instant rice until the cooking result matches the learned information, or may inform the user of the need for additional cooking so that the user may select additional cooking.

In contrast, when the thermal image representing the internal temperature and the external temperature of the cooked instant rice matches the learned information, the cooking apparatus 100 may determine that the cooked instant rice has been sufficiently cooked, and may inform the user of the cooking result.

The images of the cooking material before and after cooking may be displayed on the display 104 of the main body 101, and whether the cooking material has been appropriately cooked may be determined based on the displayed image information.

In this case, upon determining that the cooking material has not been sufficiently cooked, the cooking apparatus 100 may additionally cook the cooking material (⑤ in FIG. 6).

In contrast, upon determining that the cooking material has been sufficiently cooked, the cooking apparatus 100 may indicate completion of cooking, or may transmit information related thereto to the electronic device 300 so that the user may recognize the cooking result (⑥ in FIG. 6).

Figure 8:
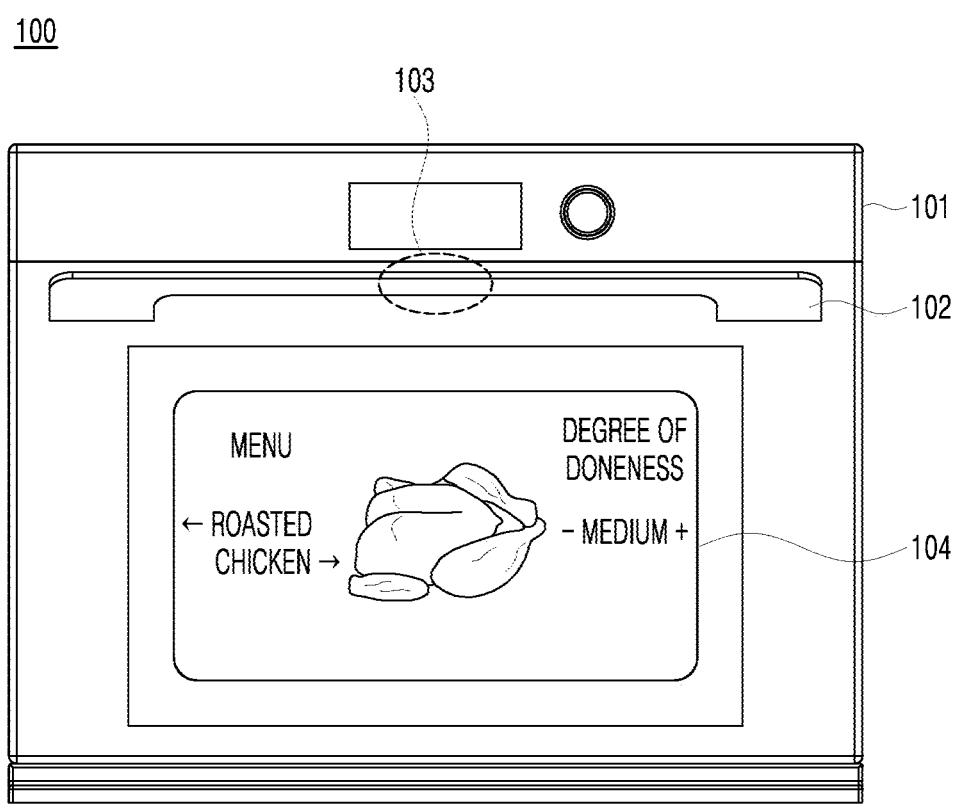
FIG. 8 is a diagram illustrating an example in which the cooked state of a cooking material is displayed on the cooking apparatus according to another embodiment of the present disclosure while the cooking material is being cooked.

FIG. 8 is a diagram illustrating an example in which the cooked state of a cooking material is displayed on the cooking apparatus according to another embodiment of the present disclosure while the cooking material is being cooked.

Any one of the processors according to the present disclosure may be configured to receive information on food that the user desires to cook, and to search for a recipe for the food that the user desires to cook.

To this end, the cooking apparatus 100 may include a user interface 170 configured to receive an operation command from the user, and the memory 150 may store therein information on the food preference of each user.

In this case, the user interface 170 may collect biometric information of the user, may apply a biometric identification neural network to the biometric information of the user who operates the main body 101 of the cooking apparatus 100 in order to recognize the user who uses the cooking apparatus 100, and may set a recipe corresponding to the preference of the user based on the information on the food preference of the user.

The biometric identification neural network may be trained to predict a recipe for the cooking material before cooking the cooking material based on the biometric information of the user who operates the main body 101.

That is, the user interface 170 collects user information, such as a user's fingerprint or iris information, and the collected user information is stored in the memory 150. Thereafter, when the user corresponding to the stored user information cooks the same cooking material as the previously cooked cooking material, the cooking apparatus 100 may automatically cook the cooking material based on the stored recipe, or may show the stored recipe to the user so that the user may more easily cook the cooking material.

As such, since the cooking material is cooked based on the user information, it may be possible to realize an individually customized cooking apparatus 100.

Further, when the cooking apparatus 100 is used in a household with a small child, the cooking apparatus 100 may not store information on the child, and thus only an adult, who is capable of safely using the cooking apparatus 100, may cook the cooking material. As a result, it may be possible to prevent the occurrence of an accident such as a fire due to the operation of the cooking apparatus by a child.

Figure 9:
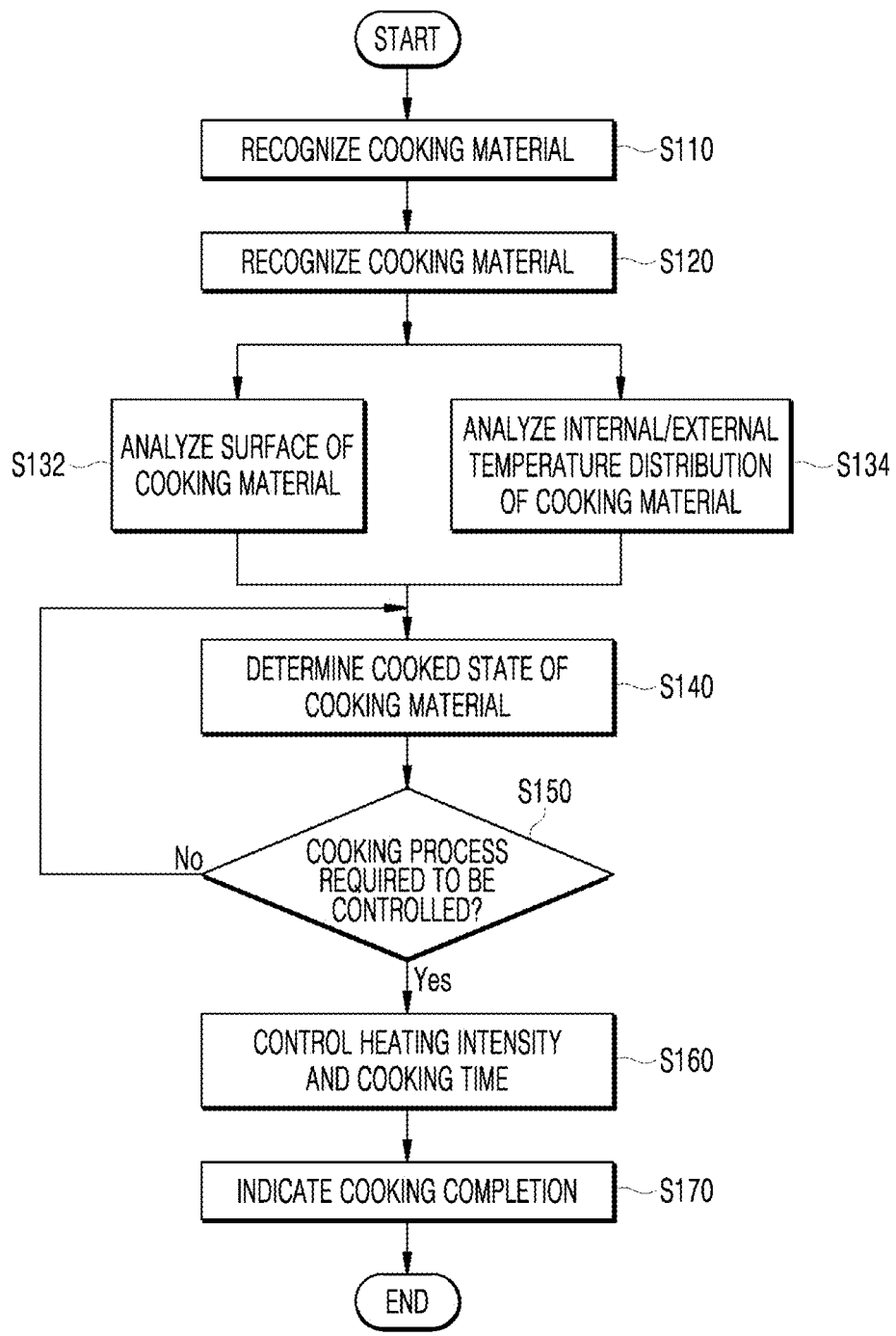
FIG. 9 is a flowchart of a method for controlling the cooking apparatus according to an embodiment of the present disclosure.

FIG. 9 is a flowchart of a method for controlling the cooking apparatus according to an embodiment of the present disclosure.

Referring to the drawing, the entity that performs each step included in the cooking apparatus control method according to an embodiment of the present disclosure may be any one of the cooking apparatus 100 and the electronic device 300. In detail, an example in which the cooking apparatus control method is executed by the processors provided in the cooking apparatus 100 will be described below.

The processors may be implemented by at least one of a central processing unit (CPU) or a graphics processing unit (GPU). Hereinafter, each step will be described in terms of the cooking apparatus 100 or the processors, that is, the entity that performs the cooking apparatus control method according to an embodiment of the present disclosure.

The cooking apparatus 100 may photograph a cooking material inputted to the cooking apparatus 100 through the camera mounted inside or outside the cooking apparatus 100, and then may recognize a captured image of the cooking material to analyze information on the cooking material (S110 and S120).

In detail, an object classifier is applied to the image of the surface of the cooking material to analyze the cooking material (S132). The RGB camera 121, which photographs the surface of the cooking material, photographs the exterior, color, and the like of the cooking material. The captured image of the cooking material is compared with the image of the surface of each kind of cooking material stored in the database 105 through learning, and information on the corresponding cooking material is extracted.

In particular, the object classifier may analyze a change in the surface of the cooking material, and may predict the cooking stage of the cooking material. For example, when the surface of instant rice is photographed, the instant rice may be cooked in accordance with a recipe that is set differently depending on the brand of the instant rice, the presence or absence of a precooked portion, or the like. Therefore, the object classifier may be trained to predict a change in the surface of the cooking material. The cooked state of the cooking material may be determined based on the trained model (S140).

Similarly, an image-processing neural network may be applied to analyze the internal temperature and the external temperature of the cooking material (S134). The thermal camera 123, which analyzes the internal temperature and the external temperature of the cooking material, seeks and detects heat to enable the user to check the temperature of the cooking material with the naked eye. Utilizing the thermal camera 123, the internal temperature and the external temperature of the cooking material may be checked, whereby the cooked state of the cooking material may be determined (S140).

In summary, the object classifier analyzes the change in the surface of the cooking material. For example, the object classifier may learn in advance the appearance of the surface of the instant rice before cooking and the appearance of the surface of the instant rice after cooking, and may compare the image of the cooked instant rice with the learned information. In this case, upon determining that the image of the cooked instant rice matches the image of the surface of the instant rice before cooking based on the learned information, the object classifier determines that the cooked instant rice has not been sufficiently cooked (S150 and S160).

In this case, the image-processing neural network may learn in advance the thermal image representing the internal temperature and the external temperature of the instant rice before cooking and the thermal image representing the internal temperature and the external temperature of the instant rice after cooking, and may compare the thermal image representing the internal temperature and the external temperature of the cooked instant rice with the learned information. In this case, upon determining that the thermal image representing the internal temperature and the external temperature of the cooked instant rice is similar to or somewhat matches the thermal image representing the internal temperature and the external temperature of the instant rice before cooking based on the learned information, the image-processing neural network determines that the cooked instant rice has not been sufficiently cooked, and adjusts the cooking intensity and time for additionally cooking the instant rice (S150 and S160).

As such, since the surface of the cooking material and the internal temperature and the external temperature of the cooking material are analyzed from the captured images of the cooking material in order to adjust the recipe for the cooking material, it may be determined whether the cooking material has been appropriately cooked.

Upon determining that the cooking material has been appropriately cooked, the cooking apparatus 100 may indicate completion of cooking to the user (S170). In this case, completion of cooking may be indicated to the user through an alarm service installed in the cooking apparatus 100, or information related to completion of cooking may be transmitted to the electronic device 300, and thus the user may receive the information related to completion of cooking while using the electronic device.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims.

Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A cooking apparatus, comprising:
a heater configured to cook a cooking material;
a camera configured to capture at least one image of the cooking material being cooked in the cooking apparatus; and
a processor configured to:
input the captured at least one image to a cooked-state determination neural network to determine a cooked state of the cooking material; and
control the heater to cook the cooking material in accordance with a preset recipe based on the determined cooked state of the cooking material,
wherein the camera comprises:
a red-green-blue (RGB) camera configured to photograph a surface state of the cooking material; and
a thermal camera configured to detect temperature information of the cooking material,
wherein the processor is further configured to determine an internal temperature and an external temperature of the cooking material based on an image-processing neural network using the captured at least one image captured by the thermal camera, and
wherein the image-processing neural network is trained to determine the internal temperature and the external temperature of the cooking material by generating a numerical value representing each pixel value of the captured at least one image.

2. The cooking apparatus according to claim 1, wherein the processor is further configured to determine a surface state of the cooking material based on the at least one captured image, wherein controlling the heater to cook the cooking material comprises heating the cooking material such that the internal temperature, the external temperature, and the surface state of the cooking material satisfy the preset recipe.

3. The cooking apparatus according to claim 1, wherein the processor is further configured to recognize a type of the cooking material by inputting the captured at least one image to an object classifier model trained to recognize the type of the cooking material based on RGB images of cooking materials.

4. The cooking apparatus according to claim 3, wherein the cooked-state determination neural network is trained to predict a cooking stage of the cooking material according to the recognized type of the cooking material based on the captured at least one image.

5. The cooking apparatus according to claim 1, wherein the image-processing neural network is trained to determine, based on the captured at least one image captured by the thermal camera, whether the internal temperature and the external temperature match a preset internal temperature and a preset external temperature according to the preset recipe.

6. The cooking apparatus according to claim 1, wherein the processor is further configured to search for recipes for cooking food desired by a user according to a user input.

7. The cooking apparatus according to claim 1, further comprising:

a user input configured to receive an operation command from a user; and a memory configured to store information on food preferences of each user, wherein the user input collects biometric information of the user, and wherein the processor is further configured to:

recognize the user using a biometric identification neural network based on the biometric information of the user; and set the preset recipe according to the stored information on food preferences of the recognized user.

8. The cooking apparatus according to claim 1, further comprising:

a display configured to display information, wherein the processor is further configured to:

cause the display to display a change in the cooked state of the cooking material during cooking; and cause the display to display an image of the cooked state of the cooking material captured by the camera.

9. A method for controlling a cooking apparatus, the method comprising:

cooking a cooking material;

capturing at least one image of the cooking material being cooked in the cooking apparatus using an RGB camera and a thermal camera configured to detect temperature information of the cooking material;

input the captured at least one image to a cooked-state determination neural network to determine a cooked state of the cooking material; and controlling the cooking of the cooking material in accordance with a preset recipe based on the determined cooked state of the cooking material, wherein the method further comprises:

determining an internal temperature and an external temperature of the cooking material based on an image-processing neural network using the captured at least one image captured by the thermal camera, and wherein the image-processing neural network is trained to determine the internal temperature and the external temperature of the cooking material by generating a numerical value representing each pixel value of the captured at least one image.

10. The method according to claim 9, further comprising determining a surface state of the cooking material based on the at least one captured image, wherein controlling the cooking of the cooking material comprises heating the cooking material such that the internal temperature, the external temperature, and the surface state of the cooking material satisfy the preset recipe.

11. The method according to claim 9, further comprising recognizing a type of the cooking material by inputting the captured at least one image to an object classifier model trained to recognize the type of the cooking material based on the captured at least one image.

12. The method according to claim 11, wherein the cooked-state determination neural network is trained to predict a cooking stage of the cooking material according to the recognized type of the cooking material based on the captured at least one image.

13. The method according to claim 9, further comprising searching for recipes for cooking food desired by a user according to a user input.

14. The method according to claim 9, further comprising:

receiving an operation command from a user;

collecting biometric information of the user; and recognizing the user based on a biometric identification neural network using the biometric information of the user; and setting the preset recipe according to information on food preferences of the recognized user stored in a memory.

15. The method according to claim 9, further comprising providing an indication of a change in the cooked state of the cooking material during cooking.

16. A cooking apparatus, comprising:

at least one processor; and a memory operably connected to the processor, wherein the memory stores instructions for, when executed by the at least one processor:

capturing at least one image of a cooking material disposed the cooking apparatus using an RGB camera and a thermal camera configured to detect temperature information of the cooking material;

inputting the captured at least one image to a cooked-state determination neural network to determine a cooked state of the cooking material; and controlling cooking of the cooking material in accordance with a preset recipe based on the determined cooked state of the cooking material, wherein:

an internal temperature and an external temperature of the cooking material are determined based on an image-processing neural network using the captured at least one image captured by the thermal camera, and wherein the image-processing neural network is trained to determine the internal temperature and the external temperature of the cooking material by generating a numerical value representing each pixel value of the captured at least one image.

* * * * *